UNITED STATES PATENT OFFICE 2,234,117

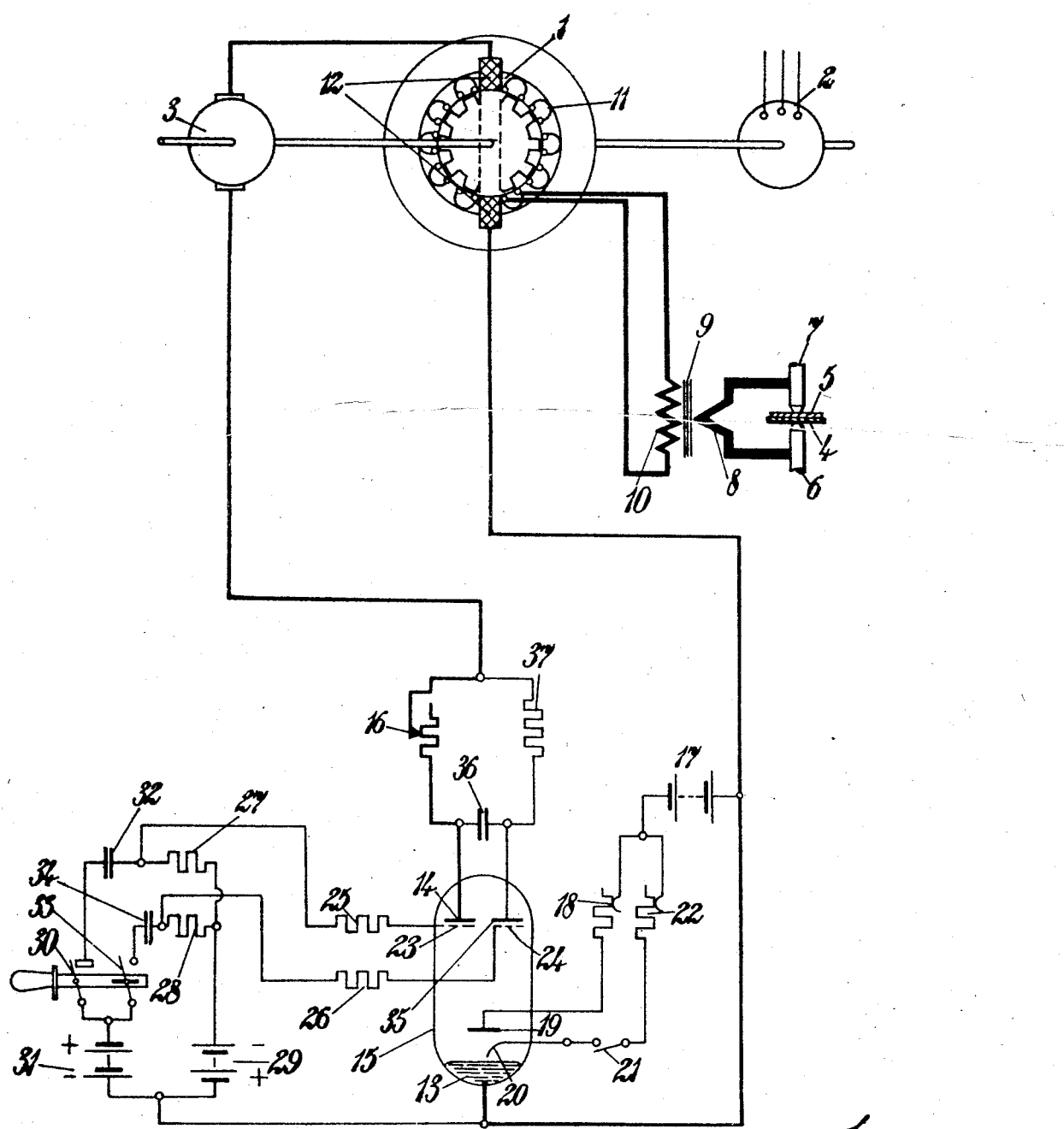

WELDING CONTROL SYSTEM

Gerhard Hagedorn, Berlin-Lichterfelde, Erwin Luxer, Berlin-Sudende, and Ernst-Günther Wahl, Berlin-Steglitz, Germany, assignors to Vertriebsgesellschaft des Leipziger Leichtmetallwerk m. b. H., Berlin-Lankwitz, Germany Application June 14, 1939, Serial No. 279,218
In Germany June 18, 1938

1 Claim. (Cl. 171—119)

This present invention relates to apparatus wherein use is made of a time switch consisting of one or more grid-controlled gas or vapour discharge tubes which are inserted in the excitation circuit of the medium or high frequency current generator feeding a medium or high frequency welding transformer. The contacts of the mechanical switches are arranged in the grid-controlled circuits of the tubes and, owing to the small switching power of these circuits, there is not produced any substantial electric arcing or burning, so that even energy impulses of very short duration can be accurately determined. In this way the speed of the variation of the generator field becomes of increased importance, more particularly in the case of light metal spot and seam welding, since it is the speed which sets a limit to the shortening of the duration of the energy in the case of full generator power.

In carrying out the invention use is preferably made of a source of continuous current voltage for the excitation of the medium or high frequency generator and of a gas or vapour discharge tube for the time switch. It is an advantage to use for the switching on or off of the continuous current circuit of the excitation of the medium or high frequency current generator one or more grid-controlled gas or vapour discharge tubes, in which one or more auxiliary electric arcs fed by continuous current are produced and maintained. The switching on of the continuous current circuit is effected by applying a positive voltage to the grid, and a switching off thereof is effected by first applying a negative voltage to the grid and thereupon either reversing the polarity of the anode voltage or reducing it for a short period of time, by connecting in parallel with the main discharge charged or non-charged condensers.

In the arrangement according to the present invention, only a small fraction of this power has to be switched on and off. More particularly the switching tube is very small, so that the welding apparatus can easily be transported. Moreover, by the means described, medium and high frequency currents can be indirectly switched on and off, which can be carried out with the known welding timing arrangements, only up to a few hundred cycles per second. The use of higher frequency means that a smaller and lighter welding transformer can be employed, which can in many cases then be brought nearer to the welding point, whereby a further economy in power is effected. The simplicity of this new arrangement will be apparent from the diagram of connections.

Referring to the accompanying drawing, the invention is illustrated by way of example in connection with a diagram of connections of an electrical welding installation comprising a medium or high frequency welding generator excited from a source of continuous current through a switching tube.

The drawing shows a medium or high frequency impulse generator used in a resistance welding installation, in which the magnetic circuits are constituted throughout by laminated iron, and in which the excitation current is derived from a source of continuous current voltage. The welding generator 1 is driven by a motor 2 and is mechanically coupled with the excitation machine 3. The two electrodes 6 and 7 rest on the metal sheets 4 and 5 to be welded together, and the electrodes are connected to the secondary winding 8 of the welding tranformer 9. The primary winding 10 carrying the higher voltage is connected to the armature winding 11 of the welding generator. The excitation winding 12 of the welding generator is connected to the armature of the continuous current excitation machine 3 through the cathode 13, anode 14 of the switching tube 15 and a regulating resistance 16. The source of continuous current voltage 17 supplies the current for the auxiliary arc of the tube 15 through the regulating resistance 18 and the auxiliary anode 19. The other terminal of the battery 17 is connected to the cathode 13 of the switching tube. For the starting of the auxiliary electric arc use is, for instance, made of a starting pin 20, which is connected to the positive terminal of the source of current 17 through the switch 21 and the regulating resistance 22. During the intervals of rest of the excitation current the two controlling grids 23 and 24 are biased, through the two grid resistances 25 and 26, and the two resistances 27 and 28 connected to the source of grid voltage 29, to a stopping potential which is negative with respect to the cathode. The positive terminal of the source of voltage 29 is connected to the cathode 13 of the switching tube. When the excitation current of the welding generator has to be switched on, the switch 30 is operated, whereby a circuit including the positive terminal of the source of grid voltage 31, switch 30, capacity 32, resistance 27, and the negative terminal of the source of grid voltage 31 is closed. At the first moment the voltage on the condenser 32 is substantially zero and the grid 23 receives a positive voltage impulse and starts the main discharge in the tube 15 ionised by the auxiliary electric arc. As soon as the charging of the condenser 32 is terminated, the grid 23 is again biased to its original stopping potential. In order to interrupt the main discharge and therewith the excitation current of the welding generator, a switch 33 is operated, whereby a circuit including the positive terminal of the source of grid voltage 31, switch 33, capacity 34, resistance 28, and the negative terminal of the source of grid voltage 31 is closed. In this way, as in the case described with reference to the grid 23, the stopping action of the grid 24 is removed, so that now also the anode 35 is started, since, at this moment it has with respect to the cathode 13 a potential which is higher than that of the anode 14 by the voltage drop on the regulating resistance 16. At the same time the discharge current of the extinguishing capacity 36 is superposed on the two anode currents in the direction of the positive condenser plates, anode 35, cathode 13, anode 14, and negative condenser plates, in this way effecting the extinguishing of the arc between the anode 14 and cathode 13. The negative voltage on the grid 23 prevents the restarting of this path. The resistance 37 is so large that the discharge of the current flowing through it is extinguished at the anode 35 by the grid 24, which has again become the negative during the charging of the capacity 34, whereby the excitation winding 12 of the welding generator 1 is disconnected from the excitation machine 3.

Preferably the two switches 30 and 33 are operated simultaneously, their switching times being relatively displaced corresponding to the selected duration of the energy impulse.

What we claim is:

A welding control system comprising in combination, a welding transformer, a relatively high frequency generator supplying current to said transformer, a field winding for said generator, a source of current and a circuit for exciting said field winding, a gaseous discharge tube having a cathode and an anode connected in said circuit for controlling the excitation of said generator, a grid biasing circuit for said tube including a condenser and a switch, a second anode within said tube, a resistor connected to the second anode and said circuit, a condenser bridging said anodes, a second grid biasing circuit associated with the second anode, a condenser in said second grid circuit, and a second switch in the second grid circuit operated by said first switch.

GERHARD HAGEDORN.
ERWIN LUXER.
ERNST-GÜNTHER WAHL.